US012692999B2

(12) United States Patent
Jurik et al.

(10) Patent No.: US 12,692,999 B2

(45) **Date of Patent: *Jul. 28, 2026**

(54) LUMINAIRE OPTICAL DEVICE COLOR COMPENSATION

(71) Applicant: ROBE lighting s.r.o., Roznov pod Radhostem (CZ)

(72) Inventors: Pavel Jurik, Prostredni Becva (CZ); Jan Zamecnik, Hodslavice (CZ); Jan Vilem, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,383

(22) Filed: Dec. 30, 2024

(65) Prior Publication Data

US 2025/0137617 A1 May 1, 2025

Related U.S. Application Data

(63) Continuation of application No. 17/864,125, filed on Jul. 13, 2022, now Pat. No. 12,188,655, which is a (Continued)

(51) Int. Cl.

*F21V 9/08* (2018.01)
*F21V 9/00* (2018.01)
(Continued)

(52) U.S. Cl.

CPC .................. *F21V 9/08* (2013.01); *F21V 9/40* (2018.02); *F21V 9/00* (2013.01); *F21V 9/083* (2013.01);

(Continued)

(58) Field of Classification Search

CPC ... F21V 9/08; F21V 9/083; F21V 9/20; F21V 9/40; F21V 14/06; F21V 14/065;

(Continued)

(56) References Cited

U.S. PATENT DOCUMENTS

| | | | |
|---|---|---|---|
| 4,602,321 | A | 7/1986 | Bornhorst |
| 5,969,868 | A | 10/1999 | Bornhorst et al. |

(Continued)

FOREIGN PATENT DOCUMENTS

| | | | |
|---|---|---|---|
| CN | 103197492 | A | 7/2013 |
| CN | 109099392 | A | 12/2018 |

(Continued)

OTHER PUBLICATIONS

Chinese Office Action; Application No. 202210049741.3; Feb. 24, 2025; 16 pages.

(Continued)

*Primary Examiner* — Colin J Cattanach

(74) *Attorney, Agent, or Firm* — Conley Rose, P.C.; Brooks W Taylor

(57) ABSTRACT

A luminaire including an LED light source, a plurality of color filters, an optical device, and a control system is provided. In response to receiving an optical device setting value via a data link, the control system moves the optical device according to the setting value; calculates a numeric value for a color change associated with the optical device setting value by calculating a position change value for at least one color filter, the position change value based on the optical device setting value; for the at least one color filter, calculates a modified color filter position based on the position change value and a current color filter position of the at least one color filter and causes the at least one color filter to move to the modified color filter position.

16 Claims, 8 Drawing Sheets

Related U.S. Application Data continuation-in-part of application No. 17/576,045, filed on Jan. 14, 2022, now Pat. No. 11,428,384.

(60) Provisional application No. 63/138,171, filed on Jan. 15, 2021.

(51) Int. Cl.

| | |
|---|---|
| ***F21V 9/20*** | (2018.01) |
| ***F21V 9/40*** | (2018.01) |
| ***F21V 14/00*** | (2018.01) |
| ***F21V 14/02*** | (2006.01) |
| ***F21V 14/04*** | (2006.01) |
| ***F21V 14/06*** | (2006.01) |
| ***F21V 14/08*** | (2006.01) |
| ***F21W 131/406*** | (2006.01) |
| ***F21Y 115/10*** | (2016.01) |
| ***H05B 45/20*** | (2020.01) |
| ***H05B 45/22*** | (2020.01) |

(52) U.S. Cl.

CPC ............... *F21V 9/20* (2018.02); *F21V 14/006* (2013.01); *F21V 14/02* (2013.01); *F21V 14/025* (2013.01); *F21V 14/04* (2013.01); *F21V 14/045* (2013.01); *F21V 14/06* (2013.01); *F21V 14/065* (2013.01); *F21V 14/08* (2013.01); *F21V 14/085* (2013.01); *F21W 2131/406* (2013.01); *F21Y 2115/10* (2016.08); *H05B 45/20* (2020.01); *H05B 45/22* (2020.01)

(58) Field of Classification Search

CPC ....... F21V 14/08; F21V 14/085; H05B 45/20; H05B 47/10; H05B 47/105; H05B 47/175; H05B 47/18; H05B 47/183; H05B 47/184; H05B 47/185; H05B 47/187; H05B 47/19; H05B 47/195; H05B 47/196; H05B 47/1965; F21W 2131/406

See application file for complete search history.

(56) References Cited

U.S. PATENT DOCUMENTS

| | | | | |
|---|---|---|---|---|
| 11,428,384 | B2 | 8/2022 | Jurik et al. | |
| 12,188,655 | B2 * | 1/2025 | Jurik | F21V 9/40 |
| 2001/0055209 | A1 | 12/2001 | Dedoro | |
| 2002/0159262 | A1 | 10/2002 | Romano et al. | |
| 2009/0231854 | A1 | 9/2009 | Jurik | |
| 2011/0012512 | A1 * | 1/2011 | Young | F21V 29/60 315/117 |
| 2018/0045390 | A1 | 2/2018 | Campetella | |
| 2018/0368217 | A1 * | 12/2018 | Toft | F21S 10/02 |
| 2019/0024860 | A1 | 1/2019 | Belliveau | |
| 2019/0078742 | A1 | 3/2019 | Dalsgaard et al. | |
| 2019/0219249 | A1 | 7/2019 | David et al. | |
| 2020/0309335 | A1 | 10/2020 | Quadri et al. | |
| 2021/0356095 | A1 | 11/2021 | Gadegaard | |
| 2022/0357018 | A1 | 11/2022 | Jurik et al. | |
| 2023/0151947 | A1 * | 5/2023 | Jensen | F21S 10/026 362/276 |

FOREIGN PATENT DOCUMENTS

| | | | |
|---|---|---|---|
| CN | 111750322 | A | 10/2020 |
| CN | 113446568 | A | 9/2021 |
| CN | 113669682 | A | 11/2021 |
| CN | 114128403 | A | 3/2022 |
| CN | 114763883 | A | 7/2022 |
| EP | 4030871 | A1 | 7/2022 |
| FR | 3094462 | A1 | 10/2020 |
| WO | 2018003241 | A1 | 1/2018 |

OTHER PUBLICATIONS

Notice of Allowance dated Apr. 14, 2022; U.S. Appl. No. 17/576,045, filed Jan. 14, 2022; 12 pages.

Office Action dated Dec. 5, 2023; U.S. Appl. No. 17/864,125, filed Jul. 13, 2022; 27 pages.

Notice of Allowance dated Aug. 30, 2024; U.S. Appl. No. 17/864,125, filed Jul. 13, 2022; 10 pages.

European Extended Search Report; Application No. 22151694.1; Jun. 3, 2022; 8 pages.

European Extended Search Report; Application No. 22184767.6; Dec. 14, 2022; 10 pages.

European Examination Report; Application No. 22184767.6; Aug. 6, 2024; 5 pages.

Chinese Office Action; Application No. 202210049741.3; Jul. 30, 2025; 13 pages.

European Examination Report; Application No. 22151694.1; Apr. 7, 2026; 7 pages.

Chinese Office Action; Application No. 202210828504.7; Mar. 31, 2026; 18 pages.

* cited by examiner

30

LUMINAIRE OPTICAL DEVICE COLOR COMPENSATION

CROSS-REFERENCE TO RELATED APPLICATIONS

This application is a continuation of U.S. patent application Ser. No. 17/864,125 filed Jul. 13, 2022 by Pavel Juřík, et al. entitled, "Luminaire Optical Device Color Compensation", which is a continuation-in-part of U.S. patent application Ser. No. 17/576,045 filed Jan. 14, 2022 by Pavel Juřík, et al. entitled, "Duv Control of Luminaire Beam Color", which claims priority to U.S. Provisional Application No. 63/138,171 filed Jan. 15, 2021 by Pavel Juřík, et al. entitled, "Duv Control of Luminaire Beam Color", all of which are incorporated by reference herein as if reproduced in their entireties.

TECHNICAL FIELD OF THE DISCLOSURE

The disclosure generally relates to luminaires, and more specifically to a color control system for providing adjustment of the Duv parameter of light emitted from luminaires, in particular white light-emitting diode (LED) based luminaires.

BACKGROUND

Luminaires utilizing white light LED light sources have become well known in the entertainment and architectural lighting markets. Such products are commonly used in theatres, television studios, concerts, theme parks, night clubs, and other venues. These LED luminaires may be static or automated luminaires. A typical static LED luminaire will commonly provide control over the intensity of the luminaire. A typical automated luminaire will commonly provide control over the intensity and color of the light output of the luminaire.

SUMMARY

In a first embodiment, a luminaire includes an LED light source, a plurality of color filters, an optical device, and a control system. The LED light source is configured to emit a white light beam. The plurality of color filters is configured to receive the white light beam and emit a colored light beam. The optical device is configured to receive the colored light beam, modify the colored light beam, and emit a modified light beam. The optical device is a gobo, a prism, a frost filter, or a zoom lens system. The control system is electrically coupled to a data link, the color filters, and the optical device and is configured to receive via a data link an optical device setting value. In response to receiving the optical device setting value, the control system causes the optical device to move based on the optical device setting value and calculates a numeric value for a color change associated with the optical device setting value by calculating a position change value for at least one color filter of the plurality of color filters, where the position change value is based on the optical device setting value. In further response to receiving the optical device setting value, the control system, for the at least one color filter, calculates a modified color filter position based on the position change value and a current color filter position of the at least one color filter and causes the at least one color filter to move to the modified color filter position.

In a second embodiment, a method of controlling a color of a light beam emitted by a luminaire includes receiving, by a control system of the luminaire via a data link, an optical device command. The optical device command comprises an optical device setting value for an optical device, the optical device configured to modify the light beam emitted by the luminaire. The method also includes causing the optical device to move based on the optical device setting value. The method further includes calculating a numeric value for a color change associated with the optical device setting value by calculating a position change value for at least one color filter of a plurality of color filters of the luminaire, the position change value based on the optical device setting value. The method also includes, for the at least one color filter of the plurality of color filters, calculating a modified color filter position based on the position change value and a current color filter position of the at least one color filter. The method further includes changing the color of the light beam by causing the at least one color filter to move to the modified color filter position in the light beam.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Figure 1:
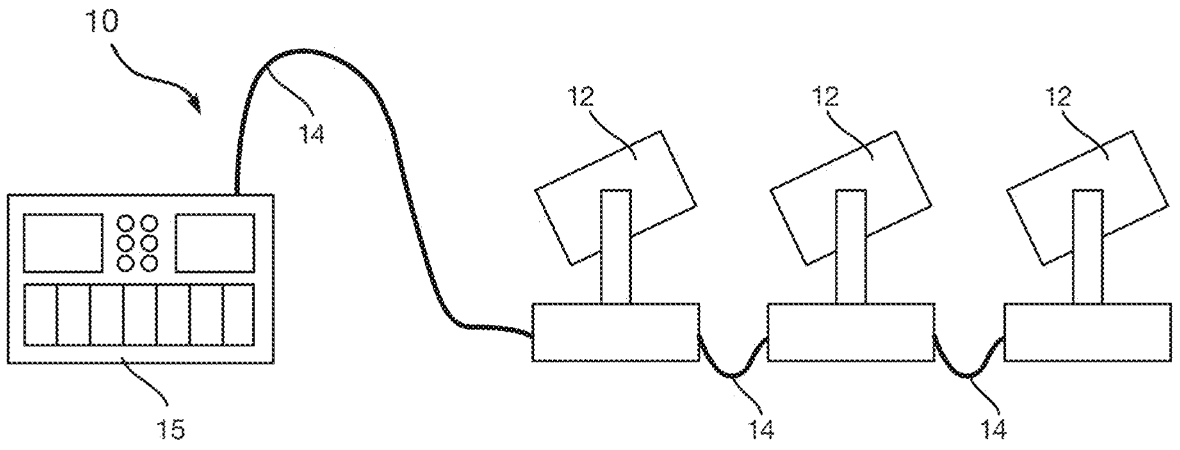
FIG. 1 presents a schematic view of an automated luminaire system according to the disclosure.

Preferred embodiments are illustrated in the figures, like numerals being used to refer to like and corresponding parts of the various drawings.

Some LED luminaires include an LED based light source designed to collate and direct light through the optical systems installed in the luminaire. The LED light sources along with associated collimating and directing optics are referred to herein as a light engine. Some LED light engines include LEDs of a single color, such as white, herein referred to as a white light LED engine. Other LED light engines include LEDs of a range of colors, where the brightness of at least some LEDs or groups of LEDs of a common color are controllable to provide additive mixing of the LED output colors. Although the embodiment described and illustrated in the disclosure uses an LED based light engine, in other embodiments the light source may use discharge lamps, plasma lamps, incandescent lamps or other suitable light sources. A color control system according to the disclosure is not dependent on nor limited by a specific light source.

A typical white light LED engine contains a plurality of white LEDs and associated optical systems to combine, collimate, and direct a light beam from the LED engine through the remainder of the optical system of the luminaire. The remainder of the optical system may include elements such as gobos, prisms, frost filters, zoom lenses and other optical devices designed to receive the light beam from the LED engine, modify the light beam, and emit a modified light beam.

The term 'white light' encompasses a range of actual colors. Light referred to as 'white' may vary from a very cold bluish white (e.g., as produced by an arc lamp) through warm reddish whites (e.g., as produced by a candle). These colors are referred to as 'white,' but may be differentiated by a characteristic referred to as 'color temperature.' The higher the value of color temperature, the more blue the 'white' light appears.

The colors of light that are accepted by the eye as white of a given color temperature may be referred to as a CCT value. 'White' beams with a common value of CCT will appear as the same color temperature to the human eye, but with a tint towards either magenta or green. The amount of tint is described by a value referred to as 'Duv.' Remotely controlled automated luminaires may have tunable color systems that enable them to emit white light beams having CCT values that are under the control of an operator of such luminaires.

Luminaires with differing types of light sources or from different manufacturers may produce light beams that have common CCT values, but that do not look the same to a human eye because the light beams differ in their Duv parameters. The color control system according to the disclosure enables a user to match the Duv of a luminaire to other luminaires that are being used in the same lighting system without changing the CCT values of the luminaires. Such matching does not require the operator to adjust manually the positions of individual color filters or the brightness of colored LED emitters.

FIG. 1 presents a schematic view of an automated luminaire system 10 according to the disclosure. The automated luminaire system 10 includes a plurality of automated luminaires 12 according to the disclosure. Each automated luminaire 12 includes a light source and parameter control devices such as color changing devices, light modulation devices, and pan and/or tilt systems to control an orientation of a head of the automated luminaire 12. Mechanical drive systems to control parameters of the automated luminaire 12 include motors or other suitable actuators coupled to control electronics, as described in more detail with reference to FIG. 6. Such actuators may include stepper motors to provide the movement for internal optical systems. Examples of such optical systems include gobo wheels, effects wheels, and color mixing systems, as well as prism, iris, shutter, and lens movement.

In addition to being connected to mains power either directly or through a power distribution system, each automated luminaire 12 is connected in series or in parallel by a data link 14 to one or more control desks 15. Upon actuation by an operator, the control desk 15 sends control signals (such as commands) via the data link 14, where the control signals are received by one or more of the automated luminaires 12. The one or more of the automated luminaires 12 that receive the control signals may respond by changing one or more of the parameters of the receiving automated luminaires 12. The control signals are sent by the control desk 15 to the automated luminaires 12 via data link 14 using DMX-512, Art-Net, ACN (Architecture for Control Networks), Streaming ACN, or other suitable communication protocol.

In some embodiments, control of the automated luminaires 12 is limited to control of an intensity of the light source. Such embodiments are often referred to as static luminaires. The static luminaire is still remotely controllable, but the user has no control over the position of the unit. In other embodiments, the automated luminaire 12 includes a motorized head or mirror to control a direction of an emitted light beam. Such embodiments are often referred to as moving luminaires. The present disclosure applies equally to moving or static luminaires.

Figure 2:
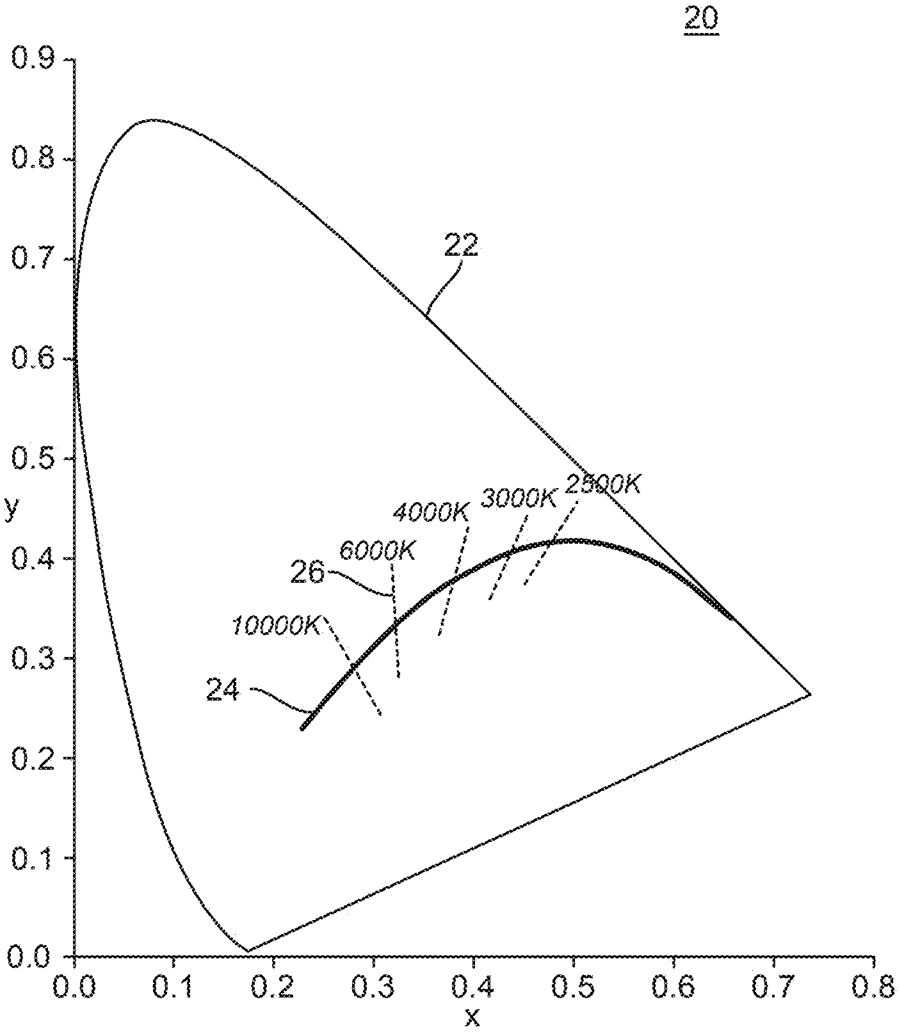
FIG. 2 presents a standard Commission Internationale de l'Éclairage (CIE) 1931 xy chromaticity diagram.

FIG. 2 presents a standard CIE 1931 xy chromaticity diagram 20. The diagram 20 shows a boundary 22, which encompasses all colors viewable by the human eye. The boundary 22 indicates the range of colors from a saturated blue in the bottom left corner, through a saturated red in the bottom right corner, and a saturated green at the top left peak of the curve. Line 24 is referred to as the 'Planckian locus' (or the 'black body' line) and indicates the color emitted by an incandescent black body at various temperatures. The Planckian locus 24 is limited to colors that are considered as 'white.' Some example color temperatures (or temperatures of the incandescent black body) are labeled on the diagram 20. For example, line 26 is the line for a color temperature of 6000 Kelvin (K). Other dashed lines in the diagram 20 represent other color temperatures.

The example color temperatures are represented in the diagram 20 as lines, rather than as single points because, while the actual white point for a given color temperature lies exactly on the Planckian locus 24, the human vision system is flexible and perceives as the same white of a given color temperature lightly saturated colors that lie close to the Planckian locus 24, but not exactly on it. The value of color temperature of light on the dashed lines that are accepted by the eye as white of a given color temperature may be referred to as the Correlated Color Temperature (CCT) value. 'White' beams with a common value of CCT will appear as the same color temperature to the human eye, but with a tint towards either magenta (for points below the Planckian locus 24) or green (for points above the Planckian locus 24). The dashed lines in FIG. 2 such as line 26 are referred to as 'CCT isotherms.' Every point along a CCT isotherm has the same value of CCT, but differs in its amount of tint, which difference is shown as a distance from the Planckian locus.

Figure 3:
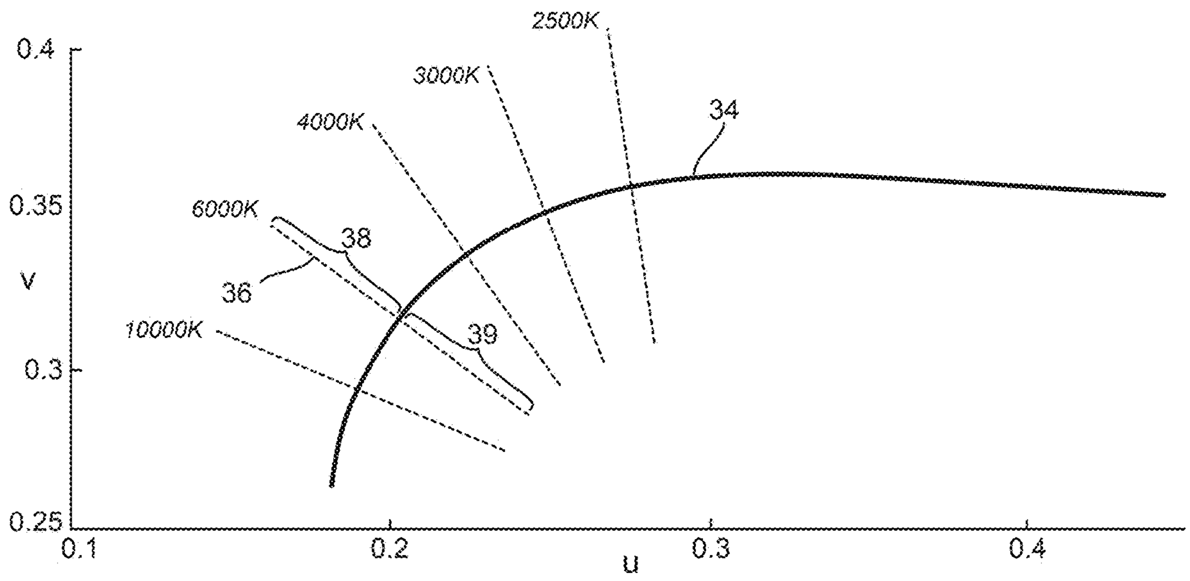
FIG. 3 presents a central portion of a standard CIE 1960 uv chromaticity diagram.

FIG. 3 presents a central portion 30 of a standard CIE 1960 uv chromaticity diagram. The full CIE 1960 uv color space describes the same range of colors as the 1931 xy chromaticity diagram 20 shown in FIG. 2 (i.e., all colors visible to the human eye), however only the portion 30 of the CIE 1960 uv color space around the Planckian locus is shown in FIG. 3. The axes in the CIE 1960 uv color space are adjusted via a linear projective transform such that CCT isotherms (e.g., CCT isotherm 36 for CCT value of 6000K) are now shown as normal to the Planckian locus 34. Because the CCT isotherms are normal to the Planckian locus 34 in the uv chromaticity diagram of FIG. 3, we can use the CCT value and CCT isotherms as orthogonal coordinates to uniquely refer to any white point. The two coordinates are referred to as CCT and Duv. Duv is sometimes referred to as 'Delta uv', 'Delta (u,v)', '+/−green', or 'plus-or-minus green'. For consistency this disclosure will use Duv throughout to refer to this parameter but it should be understood that the parameter could equally be labeled or called '+/−green' or any other synonym. CCT is the color temperature white position along the Planckian locus 34, such as the intersection point of the CCT isotherm 36 with the Planckian locus 34, while Duv is the distance an actual white color point is from the Planckian locus 34 along a given CCT isotherm. As a convention, points that are above the Planckian locus 34 (e.g., in the range 38) have positive Duv values, while points that are below the Planckian locus 34 (e.g., in the range 39) have negative Duv values. Points on a CCT isotherm that have a more positive value of Duv are perceived as having a larger amount of green tint, while those that have a more negative value of Duv are perceived as having a larger amount of pink or magenta tint.

Figure 4:
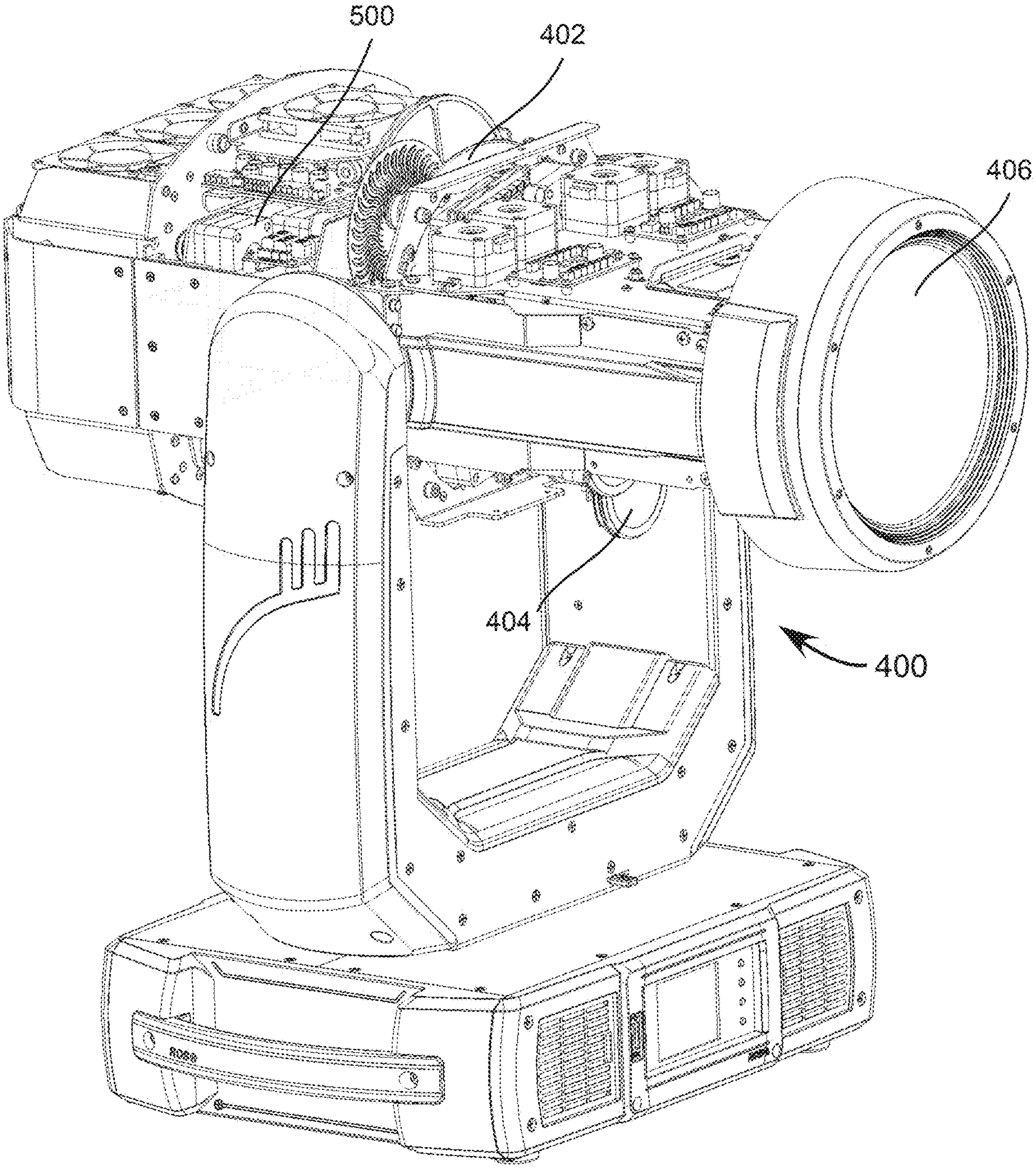
FIG. 4 presents a luminaire according to the disclosure.

FIG. 4 presents a luminaire 400 according to the disclosure. Luminaire 400 includes an LED light engine 500 emitting a colored light beam and optical devices such as gobos 402, prism and frost systems 404, and zoom lens system 406. Other embodiments may include more or fewer optical devices. Such optical devices receive the colored light beam emitted by the LED light engine 500 and emit a modified light beam.

Figure 5:
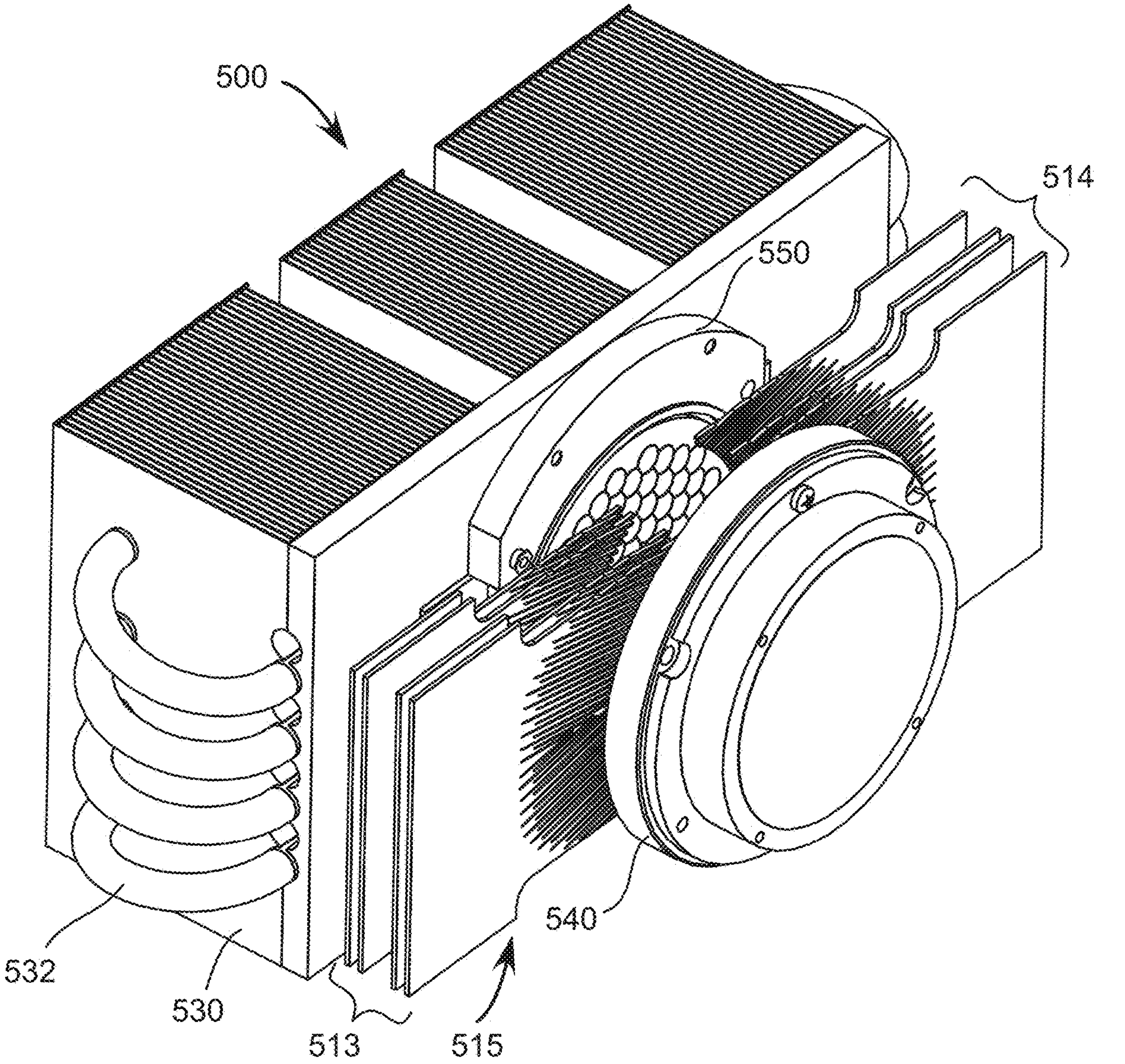
FIG. 5 presents a more detailed view of the LED light engine of FIG. 4.

FIG. 5 presents a more detailed view of the LED light engine 500 of FIG. 4. An LED light source 550 comprising an array of white light LED emitters is mechanically and thermally coupled to a heat sink 530 that includes light pipes 532. Diverging white light beams emitted by the emitters of the LED light source 550 pass through dichroic filters 513 and 514, which comprise a color mixing module 515. A control system 600 according to the disclosure (described in more detail with reference to FIG. 6) is electrically coupled to and controls the positions and settings of the LED light engine 500, the color mixing module 515, and the optical devices such as gobos 402, prism and frost systems 404, and zoom lens system 406.

While the embodiment in FIG. 5 includes a plurality of LED emitters, other embodiments may include a single LED emitter. Still other embodiments may include a single or multiple arc sources or other suitable emitter(s) of light beam(s). While the LED array of the LED light source 550 emits diverging light beams, in other embodiments a light source according to the disclosure may emit one or more parallel or converging light beams.

Dichroic filters 513 and 514 comprise like-colored pairs of filters (one each from dichroic filters 513 and 514) each comprising a dichroic coated transparent substrate. Each like-colored pair is configured to be independently positioned with the dichroic coating completely out of the light beams, fully covering the light beams, or in intermediate positions partially or completely covering one or more (i.e., a subset) of the light beams.

An integration module 540 receives the light beams emitted by the array of LEDs of the LED light source 550 and passing through the dichroic filters 513 and 514. All the light beams may still be white, if all of the dichroic filters 513 and 514 are withdrawn from the beams. All the light beams may be fully colored, if one or more pairs of the dichroic filters 513 and 514 are fully covering the beams. If one or more of the dichroic filters 513 and 514 are partially covering the light beams, various subsets of the light beams may be white, fully colored, and/or partially colored. The integration module 540 integrates brightness variations and homogenization of colors of the received light beams, to produce a single light beam with a smoother illumination and color profile across the integrated light beam. By independently and coordinately positioning the dichroic filters 513 and 514, a user may accurately control the color of the filtered light beams and produce an integrated light beam of a desired color temperature.

The integrated light beam emitted by the integration module 540 is the colored light beam emitted by the LED light engine 500. In some configurations, the dichroic filters 513 and 514 are withdrawn from the light beam and the colored light beam emitted by the LED light engine 500 is a white light beam comprising the white light beams emitted by the emitters of the LED light source 550 and integrated by the integration module 540.

In other embodiments, the white light beams emitted by the emitters of the LED light source 550 passes through the integration module 540 and then through the color mixing module 515. In such embodiments, the light beam emitting from the color mixing module 515 is the colored light beam emitted by the LED light engine 500.

The color mixing module 515 comprises four pairs of dichroic filters, one pair each in cyan, magenta, yellow, and color temperature orange (CTO). Although the pairs of dichroic filters of the color mixing module 515 are moved linearly across the light beams, other embodiments may include other numbers of dichroic filters that are moved into and out of the light beams in any suitable manner. Color mixing modules according to the disclosure may include filters configured as linear flags, rotary discs, wheels, or arcuate flags. In some embodiments color mixing modules according to the disclosure may include three dichroic filters configured as discs with patterned dichroic coatings that may be rotated across the light beams.

Dichroic filters 513 and 514 each comprises a rectangular, clear substrate whose width (short dimension) completely spans a combined height of the light beams and whose length (long dimension) is longer than the combined width of the light beams. The substrate is coated with dichroic material in a pattern comprising a first portion at a first end of the substrate, the first portion being of a size to fully cover the light beam. The first portion abuts a second portion that comprises a plurality of fingers of dichroic material whose width diminishes toward a second end of the substrate. In this way, the dichroic material of the dichroic filters 513 and 514 fully filter the light beams at the first end, and provide diminishing filtration as they are removed linearly from the light beams.

In other embodiments, the dichroic filter material may be etched, cut, or similarly configured in other patterns on a clear substrate, to form regions of differing amounts of dichroic filter interspersed with regions of clear substrate. In still other embodiments, both the dichroic filter and underlying substrate may be cut into a pattern with varying density, such as tapered fingers, such that regions of differing amount of dichroic filter are interspersed with areas where both dichroic filter and substrate have been removed.

In further embodiments, a clear substrate may be coated with a varying dichroic material, such that different regions of the coated substrate filter the light beams to different colors. In still other embodiments, differing portions of a substrate may be coated with different dichroic materials, where the portions are of sufficient size to fully cover the light beam and each portion produces a different consistent color across the entirety of the light beam. In yet other embodiments, two or more wheels may include removable individual fully coated dichroic filters that each fully covers the light beams.

The color mixing module 515 comprises four pairs of graduated color filters that are adjustable by the user to control a saturation of each color. The filters of the color mixing module 515 comprise cyan, magenta, yellow (CMY), and CTO (collectively, "CMY/CTO"). The four filters are arranged such that the white light beams from the LED light source 550 pass in series through any filters or portions of filters that are positioned in the beam, such that the resultant light color after passing through the color mixing module 515 is a subtractive combination of all four filters from the original white light of the LED emitters of the LED light source 550. In other embodiments, a CTB filter may be used in place of a CTO filter. In still other embodiments, the CTO filter is not present and only cyan, magenta, and yellow filters are used.

Each of the cyan, magenta, yellow, and CTO filters affects a characteristic range of wavelengths (or wavelength range) of the light passing through it. As the filter is moved into the white light beams from the LED light source 550, the filter removes progressively more of the light in the wavelength range from those light beams that pass through the filter. Examples of such wavelength ranges in some embodiments are band pass from 380 nanometers (nm) to 555 nm for a cyan filter, band reject from 450 nm to 620 nm for a magenta filter, band pass from 510 nm to 780 nm for a yellow filter, and transmissivity above 600 nm that decreases from 600 nm to 400 nm for a CTO filter. In other embodiments, filters having other characteristic wavelength ranges may be used.

Each of the optical devices such as the gobos 402, the prism and frost systems 404, and the zoom lens system 406 may have an effect on the color of the light beam passing through them. They may change either or both of the CCT and the Duv of the light beam. Users of color controllable luminaires are accustomed to adjusting the CCT of the light beam using the color mixing module 515, in fact, there may be a dedicated pale-yellow filter called CTO as part of the color mixing module 515 that is specifically designed for this purpose. However, adjusting the Duv of the light beam color may be more difficult. Because the Planckian locus follows a curve, the adjustment needed to change Duv without changing CCT may vary depending upon the value of CCT. At some CCT values, changing the Duv may require adjustment of only the magenta filter, while at other CCT values changing the Duv may require adjustment of all three subtractive filters to compensate for a change in Duv without changing the CCT value. The control system 600 reduces that difficulty for the user by providing a single parameter control of the Duv value while maintaining a CCT value.

During design and manufacture of a luminaire according to the disclosure (or at another stage, such as final calibration during quality control, regular maintenance, repair, or refurbishment), the color system of the luminaire may be measured and characterized so as to map out a range of CCT and Duv values the color system can provide. Then, through use of a lookup table or other computational tool, the control system 600 is configured to convert a current Duv value and a received CCT value in a CCT command received via the data link 14 into filter positions of the color mixing module 515 to produce a color specified by the current Duv value and the received CCT value or to convert a current CCT value and a received Duv value in a Duv command received via the data link 14 into filter positions to produce a color specified by the current CCT value and the received Duv value.

In some embodiments, the CCT value is received on a CCT control channel of the data link 14 and the Duv command value is received on a Duv control channel of the data link 14. In other embodiments, a command value is received via the data link 14 along with information identifying the command value as a CCT value or a Duv value. In some embodiments, only a CCT value is received and the Duv command value defaults to a zero value.

For example, the color mixing module 515 may be adjusted by use of the CCT control channel to provide the 6000K CCT indicated by CCT isotherm 36 in FIG. 3. Then, as the user adjusts the Duv control channel, the control system 600 automatically recalculates and re-positions any necessary ones of the dichroic filters 513 and 514 so that the light beam color moves along the 6000K CCT isotherm 36. The user may thus adjust the Duv value into the positive range 38 or the negative range 39, as desired, without accidentally also changing the CCT of the emitted light beam. In some embodiments, the Duv parameter adjustment system according to the disclosure allows the user to control Duv within a range of +/−0.02.

Tables 1 and 2 presents lookup tables for converting Duv command values on the Duv control channel into filter motor positions for CCT values 6000K and 3200K, respectively, on the CCT control channel. The filter motor positions correspond to positions of the dichroic filters 513 and 514 in the LED light beams from the LED light source 550. Similar tables may be provided for other frequently used values of CCT (e.g., 2500K, 4000K, and 10,000K). Other Duv command values may be converted into filter motor positions by interpolating between values in adjacent rows of a lookup table (e.g., a Duv command value of 0.005 for 6000K may be calculated from values in the 6000K tables for Duv command values of 0.003 and 0.01). Similarly, for other CCT values received on the CCT control channel, Duv command values may be converted into filter motor positions by interpolation (linear or nonlinear) between values in adjacent lookup tables (e.g., Duv command values for 3000K may be calculated from values in the tables for 3200K and 2500K).

TABLE 1

| CCT | Duv | Cyan | Magenta | Yellow | CTO |
|---|---|---|---|---|---|
| 6000K | 0.02 | 5% | 1.6% | 6% | 9.0% |
| 6000K | 0.01 | 5% | 2.2% | 6% | 9.5% |
| 6000K | 0.003 | 5% | 3.1% | 6% | 9.8% |
| 6000K | 0.001 | 5% | 3.7% | 6% | 9.9% |
| 6000K | 0.00 | 5% | 4% | 6% | 10% |
| 6000K | −0.001 | 5% | 4.3% | 6% | 10.1% |
| 6000K | −0.003 | 5% | 4.9% | 6% | 10.2% |
| 6000K | −0.01 | 5% | 5.8% | 6% | 10.5% |
| 6000K | −0.02 | 5% | 6.5% | 6% | 11.0% |

TABLE 2

| CCT | Duv | Cyan | Magenta | Yellow | CTO |
|---|---|---|---|---|---|
| 3200K | 0.02 | 8% | 1.0% | 9.2% | 88% |
| 3200K | 0.01 | 8% | 1.2% | 8.6% | 90% |
| 3200K | 0.003 | 8% | 1.8% | 8.2% | 91% |
| 3200K | 0.001 | 8% | 1.9% | 8.1% | 91.5% |
| 3200K | 0.00 | 8% | 2.0% | 8.0% | 92% |
| 3200K | −0.001 | 8% | 2.1% | 7.9% | 92.5% |
| 3200K | −0.003 | 8% | 2.2% | 7.8% | 93% |
| 3200K | −0.01 | 8% | 2.8% | 7.4% | 94% |
| 3200K | −0.02 | 8% | 3.0% | 6.8% | 96% |

This facility enables the user to match the Duv of a luminaire according to the disclosure to other luminaires being used in the same lighting system. Luminaires with differing types of light sources, or even those from other manufacturers that use the same type of light source, may produce light beams of the same color temperature or CCT value, but still not look the same to a human eye or a camera because the light beams differ in their Duv parameters. The Duv parameter adjustment system according to the disclosure enables the user to match light beams visually to the eye and/or camera without altering the CCT values of the luminaires. Such matching may be done without having to manually adjust individual CMY/CTO color parameters of the color mixing system. Light beams from luminaires according to the disclosure may be more closely matched with other white light sources.

In some embodiments, the Duv parameter adjustment system according to the disclosure provides automatic Duv correction as optical devices are inserted/removed into/from the beam or as they are adjusted. Optical systems for which automatic Duv correction may be made may include the gobos 402, the prism and frost systems 404, and the zoom lens system 406, as well as prism, iris, shutter, neutral density (ND) dimming and lens movement devices. In some embodiments, the LED light source 550 is an optical device for which automatic Duv correction may be made, as the color temperature of the LEDs may change as they are dimmed electronically.

In one example, the adjustment by a user of a focal length of the zoom lens system 406 from a narrow beam setting to a wide beam setting may alter the Duv value of the emitted light beam. In such embodiments, the Duv parameter adjustment system according to the disclosure is configured to compensate for this emitted beam Duv change in an active, dynamic manner.

The control system 600 in such embodiments may be either controlling, monitoring, or otherwise determining a setting of the zoom lens system 406 (e.g., positions and movement of the motors that control the zoom lens focal length). As a focal length of the zoom lens system 406 changes (whether by independent control or by operation of the control system 600), the control system 600, without requiring user intervention, determines the new setting and uses the motor position information to automatically adjust the color mixing system to correct the Duv continuously to maintain a commanded Duv value. In other embodiments, where inserting a glass gobo, frost filter, or prism alters the Duv value of the emitted light beam, or where the beam is dimmed by electronic dimming or an ND filter, the control system 600 is configured to compensate automatically for such changes and maintain the commanded Duv value.

Table 3 presents a lookup table for changes in Duv value produced by zoom lens focal length changes, either alone or in combination with other optical devices, in a sample luminaire where the CCT/Duv tables were created with the zoom lens set to a wide zoom angle. In the example luminaire, as the zoom angle is adjusted from narrow to wide, the Duv value change varies from 0.0005 to 0.0. In other luminaires, the Duv value may change over a larger range, for example, 0.0 to 0.01. The Duv value change from Table 3 can be applied to the commanded Duv value and a resulting adjusted Duv value be combined with a CCT value using the lookup tables and interpolation techniques described above.

TABLE 3

| | Zoom Narrow | Zoom Mid | Zoom Wide |
|---|---|---|---|
| No effects inserted | 0.0005 | 0.0003 | 0.0 |
| Gobo inserted | 0.0002 | 0.0000 | −0.0017 |
| Prism inserted | −0.0011 | −0.0016 | −0.0013 |
| Frost inserted | −0.0008 | −0.0012 | −0.0011 |

In other embodiments, a parameter adjustment system according to the disclosure may compensate for changes in one or both of Duv and CCT value produced by optical device changes. In such embodiments, a table similar to Table 3 may include change values for both Duv and CCT that are caused by optical devices alone or in combination. As described for Table 3, such Duv and CCT value changes can be applied to commanded Duv and/or CCT values and resulting adjusted Duv and/or CCT values be used with the lookup tables and interpolation techniques described above.

In some embodiments, a Duv parameter adjustment system according to the disclosure may be used with an additive color mixing LED light source that includes LEDs or groups of LEDs of a plurality of colors, as previously described. In some such embodiments, the additive color mixing LED light source includes LEDs emitting light in a plurality of colors such that, by adjusting the relative brightness of each color of LED, the color of the output beam can also be adjusted. The LED colors used for an additive color mixing system, may be chosen from, but are not restricted to, red, green, blue, cyan, amber, lime, and white.

Each of the groups of like-colored LEDs emits light in a characteristic wavelength range. Examples of such wavelength ranges in some embodiments are 580 nm to 700 nm for red LEDs, 470 nm to 610 nm for green LEDs, 400 nm to 530 nm for blue LEDs, and 550 nm to 670 nm for amber LEDs. In other embodiments, LEDs emitting light in other characteristic wavelength ranges may be used.

In such embodiments, as the user adjusts the command value on the Duv control channel, the control system 600 automatically recalculates the relative brightness of one or more colors of LED so that movement of the emitted color is constrained along a user-selected CCT isotherm. Thus, the Duv parameter adjustment system according to the disclosure enables the user of a fixture with an additive color mixing LED light engine to visually match luminaires according to the disclosure to the eye and/or camera without altering the CCT values of the luminaires and to do so without having to manually adjust individual brightness of each color of LED.

Luminaires according to the disclosure comprise an LED light source that emits a colored light beam having a color that is determined by controlling a brightness of each of a plurality of ranges of wavelengths. In such an LED light source having a subtractive color system (such as the color mixing module 515 of FIG. 5), the ranges of wavelengths are determined by filter characteristics of the like-colored pairs of filters in the dichroic filters 513 and 514 and the brightness of each range of wavelengths is controlled by the movement of the filters into and out of the light beam. In such an LED light source having such an additive color mixing system, the ranges of wavelengths are determined by the colors of the LEDs and the brightness of each range of wavelengths is controlled by the brightness of each color of LED.

In summary, the Duv parameter adjustment system according to the disclosure provides at least the following benefits in both subtractive and additive color mixing luminaires:

a. Allows the user to use a single control to match the Duv value of light emitted from a luminaire according to the disclosure to another luminaire without changing the CCT value, using variable subtractive color mixing.
b. Provides an automatic system for modifying the Duv value of light emitted from a luminaire according to the disclosure using variable subtractive color mixing so as to keep the Duv constant as optical devices are adjusted or inserted or removed from the light beam of the luminaire.

Figure 6:
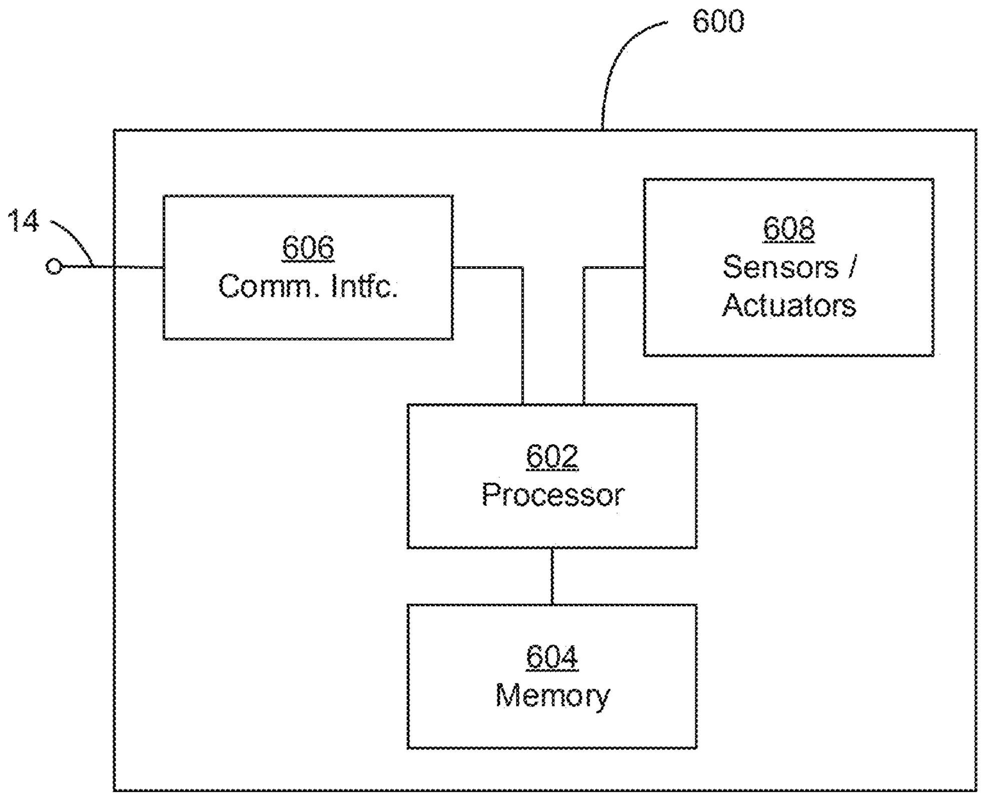
FIG. 6 presents a block diagram of a control system for an automated luminaire according to the disclosure.

FIG. 6 presents a block diagram of the control system (or controller) 600 for an automated luminaire 12 according to the disclosure. The control system 600 is suitable for use to control the LED light source 550 and color mixing module 515 and other optical modules of the luminaire 400. The control system 600 is also suitable for controlling other control functions of the automated luminaire 12. The control system 600 includes a processor 602 electrically coupled to a memory 604. The processor 602 is implemented by hardware and software. The processor 602 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 602 is further electrically coupled to and in communication with a communication interface 606. The communication interface 606 is coupled to, and configured to communicate via, the data link 14. The processor 602 is also coupled via a control interface 608 to one or more sensors, motors, actuators, controls, and/or other devices of the automated luminaire 12. The processor 602 is configured to receive control signals from the data link 14 via the communication interface 606 and, in response, to control the LED light engine, color mixing systems and other mechanisms of the automated luminaire 12 via the control interface 608.

The control system 600 is suitable for implementing processes, color control, and other functionality as disclosed herein, which may be implemented as instructions stored in the memory 604 and executed by the processor 602. The memory 604 comprises one or more disks and/or solid-state drives and may be used to store instructions and data that are read and written during program execution. The memory 604 may be volatile and/or non-volatile and may be read-only memory (ROM), random access memory (RAM), ternary content-addressable memory (TCAM), and/or static random-access memory (SRAM).

Figure 7:
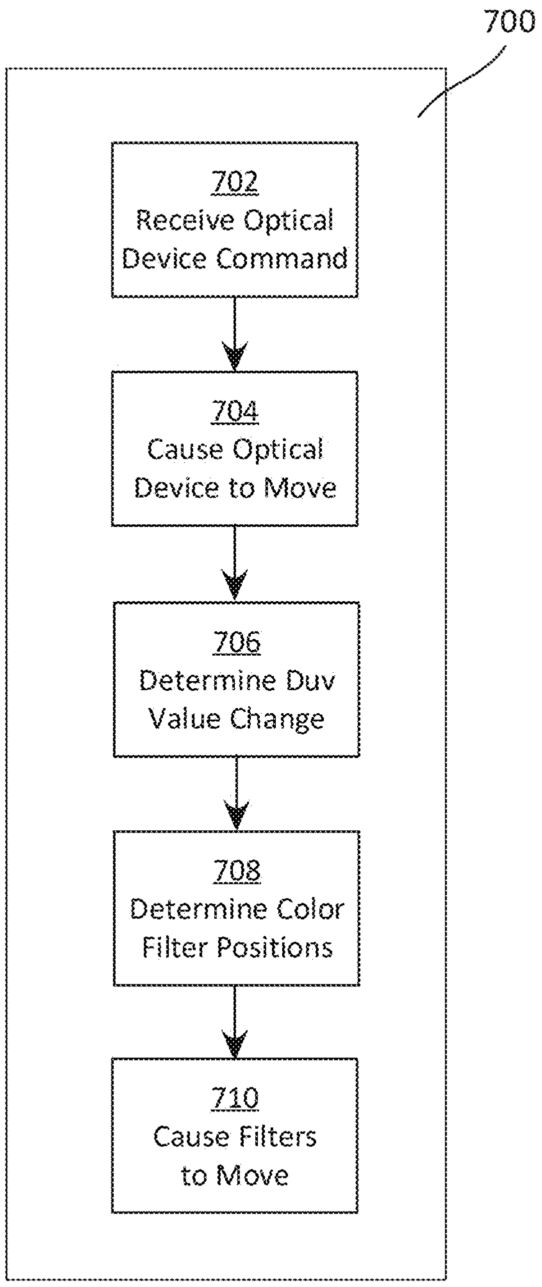
FIG. 7 presents a flow chart of a process for color control of an automated luminaire according to the disclosure.

FIG. 7 presents a flow chart of a process 700 for color control of an automated luminaire according to the disclosure. The process 700 is described with reference to elements of the luminaire 400, the LED light engine 500, and the control system 600 described with reference to FIGS. 4, 5, and 6, respectively.

In step 702, the control system 600 receives via the data link 14 an optical device command, which includes a setting value for an optical device configured to modify the light beam emitted by the automated luminaire 12, such as the gobos 402, the prism and frost systems 404, the zoom lens system 406, an ND filter dimmer, or an electronically dimmed LED light source. In step 704, the control system 600 causes the optical device to move based on the setting value.

In step 706, the control system 600 determines a change in a Duv value of a color of the light beam emitted by the automated luminaire 12, where the Duv value change is caused by the optical device moving to the setting value. In some embodiments, in step 706 the control system 600 determines changes in one or both the Duv and CCT values of the light beam, caused by the optical device moving to the setting value. In step 708, based on the Duv and/or CCT value changes, a current correlated color temperature (CCT) value of a CCT isotherm, and a current Duv value, the control system 600 determines a first position of a first color filter of the luminaire and a second position of a second color filter of the automated luminaire 12. In step 710, the control system 600 causes a color of the light beam to change by causing the first color filter to move to the first position in the light beam and the second color filter to move to the second position in the light beam.

In some embodiments, in addition to CCT and/or Duv control channels, the luminaire 400 is configured to receive control channels for individual control of positions of the cyan, magenta, and yellow filters ("the CMY filters") of the color mixing module 515. In such embodiments, the user may use the CCT and/or Duv control channels to set a desired 'white' color for the luminaire 400 to emit when the CMY filter control channels ("color control channels") are set to nominal zero command values. As described above, lookup tables such as Tables 1 and 2 may be used to convert such CCT and/or Duv control channel values (or CCT and/or Duv values) into color filter positions that produce the desired 'white' color. Color filter positions are expressed as percentages on color control channels and in Tables 1 and 2. In many embodiments, the color filter percentages do not convert linearly to physical positions of the color filters such as dichroic filters 513 and 514. In such embodiments, another lookup table may be used to convert color filter position as a percentage into color filter position as a physical position of the dichroic filters 513 and 514. In the present disclosure, the phrase 'color filter position' refers to a color filter percentage, rather than directly to a physical position of a color filter.

The user may subsequently use one or more of the color control channels to move the CMY filters into positions that cause the luminaire 400 to emit a light beam of a desired color. As described above, optical devices of the luminaire 400, when inserted, removed, or adjusted in the beam, may result in a perceptible change in the color of the light beam emitted by the luminaire 400 away from the desired color set by the user with the color control channels. The change may be more perceptible in some colors than in others, or by some users more than by others. In such embodiments, a modified version of the process 700 reduces the amount of change produced by the optical device(s) in the emitted color of the luminaire 400 by modifying the current color filter positions as set by the color control channels. In some cases, the current color filter positions are modified to compensate for a change in setting of the optical device(s) in the light beam.

As described with reference to Table 3, insertion, removal, or adjustment of optical devices in the light beam of the luminaire 400 may cause changes in either or both of Duv and CCT values of the light beam. As also described, in some embodiments of the disclosure a lookup table for changes for such color changes includes change values (or adjustments) for both Duv and CCT. Table 3A presents an example of such a lookup table for CCT and/or Duv changes.

TABLE 3A

| | Zoom Narrow | Zoom Mid | Zoom Wide |
|---|---|---|---|
| No effects inserted | 70K CCT<br>0.0005 Duv | 50K CCT<br>0.0003 Duv | 0K CCT<br>0.0 Duv |
| Gobo inserted | 80K CCT<br>0.0002 Duv | 30K CCT<br>0.0000 Duv | −20K CCT<br>−0.0017 Duv |
| Prism inserted | −10K CCT<br>−0.0011 Duv | −40K CCT<br>−0.0016 Duv | −25K CCT<br>−0.0013 Duv |
| Frost inserted | 5K CCT<br>−0.0008 Duv | −30K CCT<br>−0.0012 Duv | −15K CCT<br>−0.0011 Duv |

Figure 8:
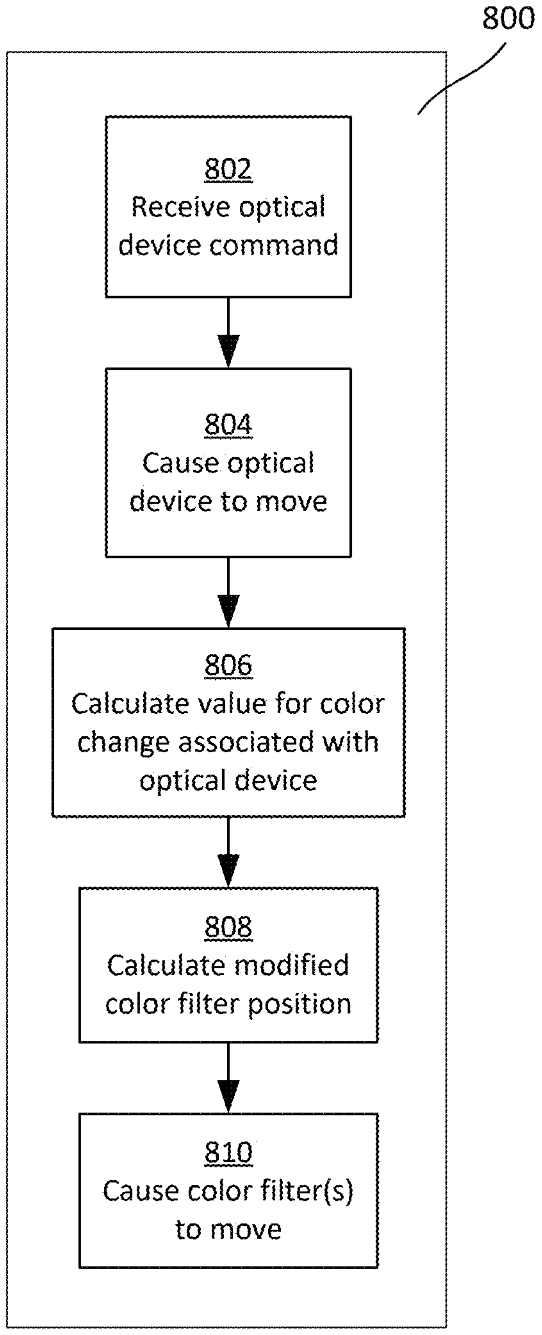
FIG. 8 presents a flow chart of a process for color control of an automated luminaire according to the disclosure.

FIG. 8 presents a flow chart of a process 800 for color control of an automated luminaire according to the disclosure. The process 800 is described with reference to elements of the luminaire 400, the LED light engine 500, and the control system 600 described with reference to FIGS. 4, 5, and 6, respectively.

In step 802, the control system 600 receives via the data link 14 an optical device command, which includes a setting value for an optical device configured to modify the light beam emitted by the automated luminaire 12, such as the gobos 402, the prism and frost systems 404, the zoom lens system 406, an ND filter dimmer, or an electronically dimmed LED light source. In step 804, the control system 600 causes the optical device to move based on the setting value.

In step 806, the control system 600 calculates a numeric value for a color change associated with the optical device setting value, where the Duv color change is caused by the optical device moving to the setting value. In step 808, for at least one of the CMY/CTO filters, the control system 600 calculates modified color filter position(s) based on the numeric value and a current color filter position(s) of the color filter(s). The current color filter positions may be set by the user via the color control channels and/or the CCT and/or Duv control channels. In step 810, the control system 600 causes the color filter(s) to move to the modified color filter position(s).

In a first embodiment, the process 800 operates by calculating a change in CMY/CTO filter positions that would compensate a white beam for positioning of an optical device in the white beam, and then applying that calculated change in CMY/CTO filter positions to any current CMY/CTO filter positions. The embodiment determines color filter positions that represents the current 'white' setting of the CCT and/or Duv control channels, determines a change in those CMY filter positions that would compensate for an optical device positioned in the light beam, and then applies that change to the current CMY filter positions. That is, the process 800 changes the CMY/CTO filter positions by an amount that approximates the change caused by the optical device. A second embodiment of the process 800 is described below that applies a closer approximation of the change caused by the optical device to the CMY/CTO filter positions.

In the first embodiment of the process 800, in step 806 the control system 600 calculates the numeric value for the color change by calculating a position change value for the at least one CMY/CTO filter, the position change value based on the optical device setting value and CCT and/or Duv control channel values received by the control system 600 via the data link 14. In such embodiments, in step 808, the control system 600 calculates the modified color filter position for the at least one CMY/CTO filter based on the position change value and the current color filter position of the at least one CMY/CTO filter. Where a change in a color filter position results in a value below zero or above 100, the modified color filter position is limited to a value of zero or 100, respectively.

In some such first embodiments, in step 806 the control system 600 calculates the position change value for the at least one CMY/CTO filter in three sub-steps. In the first sub-step, the control system 600 determines at least one of a Duv and a CCT adjustment, the at least one Duv and/or CCT adjustment based on the optical device setting value, and determined using a lookup table such as Table 3 or 3A. In the second sub-step, the control system 600 generates adjusted CCT and Duv values based on the at least one Duv and/or CCT adjustment and the CCT and/or Duv control channel values by adding the at least one Duv and/or CCT adjustment to the current CCT and/or Duv control channel value settings. In the third sub-step, the control system 600 calculates the position change value for the at least one CMY/CTO filter based on the adjusted CCT and Duv values.

In further such first embodiments, in the third sub-step the control system 600 calculates the position change value for the color filter based on the adjusted CCT and Duv values in three further sub-steps. In the first further sub-step, the control system 600 determines a first color filter position for the at least one CMY/CTO filter by converting current CCT and/or Duv control channel values to color filter positions using a lookup table such as Table 1 or 2. In the second further sub-step, the control system 600 determines a second color filter position for the at least one CMY/CTO filter, the second color filter position based on the adjusted CCT and Duv values generated in the second sub-step above by using a lookup table such as Table 1 or 2 to convert the adjusted CCT and Duv values to the second color filter positions. Where the adjusted CCT value is not a value represented in its own lookup table or a Duv value is not represented in its own row of a lookup table, interpolation between cells in different tables and/or rows may be used to convert the adjusted CCT and Duv values to color filter positions. In the third further sub-step, the control system 600 calculates the position change value (if any) for the at least one CMY/CTO filter based on a color filter position difference between the first and second color filter positions for the at least one CMY/CTO filter, the color filter position difference calculated by subtracting the CMY/CTO filter's first color filter position value from its second color filter position value.

As described above, in a second embodiment of the disclosure, the process 800 applies a closer approximation of the change caused by the optical device to the CMY/CTO filter positions. In such an embodiment, modified color filter positions are calculated to correct for the change in color caused by the insertion, removal, or adjustment of optical devices in the light beam of the luminaire 400 using color matrix calculation. In various embodiments, the color matrices used may be expressed in red, green, blue (RGB), XYZ, or other suitable color coordinate system.

For each combination of optical devices shown in Tables 3 and 3A, the change in light beam color caused by the one or more optical devices may be measured and expressed as an RGB color matrix (a 'device color matrix'), as shown in Table 3B.

TABLE 3B

| | Zoom Narrow | Zoom Mid | Zoom Wide |
|---|---|---|---|
| No effects inserted | $[D_{ZN}]$ | $[D_{ZM}]$ | $[D_{ZW}]$ |
| Gobo inserted | $[D_{G\text{-}ZN}]$ | $[D_{G\text{-}ZM}]$ | $[D_{G\text{-}ZW}]$ |
| Prism inserted | $[D_{P\text{-}ZN}]$ | $[D_{P\text{-}ZM}]$ | $[D_{P\text{-}ZW}]$ |
| Frost inserted | $[D_{F\text{-}ZN}]$ | $[D_{F\text{-}ZM}]$ | $[D_{F\text{-}ZW}]$ |

Each device color matrix has the form:

$$[D]=\begin{bmatrix}0.9 & 0 & 0 & 0\\ 0 & 0.85 & 0 & 0\\ 0 & 0 & 1 & 0\\ 0.01 & 0.02 & -0.005 & 1\end{bmatrix}$$

where the first three columns represent R, G, and B components of the change, respectively. The non-zero values on the diagonal represent an amount by which each color is scaled and the number at the bottom of each column represents an amount by which each color is offset. The values in the first three columns represent a change in the color of the light beam caused by the one or more optical devices and may be different in each device color matrix of Table 3B.

Similarly, when the user sets one or more of the CMY color control channels to cause the luminaire 400 to emit a light beam of a desired color, that color may also be expressed as an RGB color matrix value (a 'desired color matrix'), for example:

$$[C] = \begin{bmatrix} 1 & 0 & 0 & 1 \\ 0 & 0.7 & 0 & 1 \\ 0 & 0 & 0.2 & 1 \\ 0 & 0 & 0 & 1 \end{bmatrix}$$

Here, the values on the diagonal represent the brightness of each color (R, G, B) in the emitted light beam. A color represented as CMY filter positions may be converted to an equivalent RGB color matrix representation.

Modified CMY color filter positions may be calculated to correct for the change in color caused by the one or more optical devices using the following calculation:

$$[C_{modified}]=[C]\times[D]^{-1}$$

That is, [C] is multiplied by the inverse of [D] to generate a modified color matrix [$C_{modified}$], representing a color that, when projected through the one or more optical devices, will be emitted as the desired color set by the user as represented by the desired color matrix [C]. The operations of matrix inversion and matrix multiplication are familiar to a person of skill in the art and are applicable to color matrices. The modified color matrix [$C_{modified}$] is an RGB color matrix that can be converted to modified color filter positions for the CMY filters. The CMY filters may then be moved to those positions to cause the luminaire 400 to emit the desired color set by the user via the color control channels.

In such second embodiments of the process 800, in step 806 the control system 600 calculates a numeric value for a color change associated with the optical device setting value by determining a device color matrix representing a color change for each of the one or more color filters, where the color change is associated with the optical device setting value. In some such embodiments, the color change is caused by the optical device moving to a position associated with the optical device setting value.

In step 808 of such second embodiments, the control system 600 calculates the modified color filter position for the at least one CMY/CTO filter in three sub-steps. In the first sub-step, the control system 600 calculates a desired color matrix based on current filter positions of the plurality of color filters. The current color filter positions may be set by the user via the color control channels and/or the CCT and/or Duv control channels. In the second sub-step, the control system 600 calculates a modified color matrix based on the desired color matrix and the device color matrix. In some such embodiments, the control system 600 multiplies the desired color matrix by an inverse of the device color matrix. In the third sub-step, the control system 600 calculates the modified color filter position based on the modified color matrix.

While only some embodiments of the disclosure have been described herein, those skilled in the art, having benefit of this disclosure, will appreciate that other embodiments may be devised which do not depart from the scope of the disclosure. While the disclosure has been described in detail, it should be understood that various changes, substitutions, and alterations can be made hereto without departing from the spirit and scope of the disclosure.

What is claimed is:

1. A luminaire, comprising:

a light-emitting diode (LED) light source configured to emit a white light beam;

a plurality of color filters configured to receive the white light beam and emit a colored light beam;

an optical device configured to receive the colored light beam, modify the colored light beam, and emit a modified light beam, wherein the optical device is a gobo, a prism, a frost filter, or a zoom lens system; and a control system electrically coupled to a data link, the plurality of color filters, and the optical device, the control system configured to receive via the data link an optical device setting value and in response:

cause the optical device to move based on the optical device setting value;

calculate a numeric value for a color change associated with the optical device setting value by calculating a position change value for at least one color filter of the plurality of color filters, the position change value based on the optical device setting value;

for the at least one color filter:

calculate a modified color filter position based on the position change value and a current color filter position of the at least one color filter; and cause the at least one color filter to move to the modified color filter position.

2. The luminaire of claim 1, wherein the control system is configured to:

calculate the numeric value for the color change by determining a numeric value of a device color, where the numeric value of the device color comprises a color change for each color filter of the plurality of color filters, the color change associated with the optical device setting value; and calculate the modified color filter position for the at least one color filter by:

calculating a numeric value of a desired color based on current filter positions of the plurality of color filters;

calculating a numeric value of a modified color based on the numeric value of the desired color and the numeric value of the device color; and calculating the modified color filter position based on the numeric value of the modified color.

3. The luminaire of claim 2, wherein each of the numeric value of the device color, the numeric value of the desired color, and the numeric value of the modified color comprises a color matrix.

4. The luminaire of claim 3, wherein each of the numeric value of the device color, the numeric value of the desired color, and the numeric value of the modified color comprises a red, green, blue (RGB) color matrix.

5. The luminaire of claim 3, wherein the control system is configured to calculate the color matrix of the numeric value of the modified color by multiplying the color matrix of the numeric value of the desired color by an inverse of the color matrix of the numeric value of the device color.

6. The luminaire of claim 1, wherein the luminaire comprises a second optical device and the control system is configured to receive via the data link a second optical device setting value and in response:

cause the second optical device to move based on the second optical device setting value;

calculate a second numeric value for a second color change associated with the second optical device setting value;

calculate for the at least one color filter a second modified color filter position based on the second numeric value; and cause the at least one color filter to move to the second modified color filter position.

7. The luminaire of claim 1, wherein the white light beam comprises a plurality of white light beams.

8. The luminaire of claim 7, wherein at least some white light beams of the plurality of white light beams are diverging light beams.

9. The luminaire of claim 7, wherein in at least one position of the at least one color filter of the plurality of color filters, light beams of a first subset of the plurality of white light beams pass through the at least one color filter.

10. A method of controlling a color of a light beam emitted by a luminaire, the method comprising:

receiving, by a control system of the luminaire via a data link, an optical device command, the optical device command comprising an optical device setting value for an optical device, the optical device configured to modify the light beam emitted by the luminaire, wherein the optical device is a gobo, a prism, a frost filter, or a zoom lens system;

causing the optical device to move based on the optical device setting value;

calculating a numeric value for a color change associated with the optical device setting value by calculating a position change value for at least one color filter of a plurality of color filters of the luminaire, the position change value based on the optical device setting value;

for the at least one color filter of the plurality of color filters, calculating a modified color filter position based on the position change value and a current color filter position of the at least one color filter; and changing the color of the light beam by causing the at least one color filter to move to the modified color filter position in the light beam.

11. The method of claim 10, wherein:

calculating the numeric value for the color change comprises determining a numeric value of a device color, where the numeric value of the device color comprises a color change for each color filter of the plurality of color filters, the color change associated with the optical device setting value; and calculating the modified color filter position for the at least one color filter comprises:

calculating a numeric value of a desired color based on current filter positions of the plurality of color filters;

calculating a numeric value of a modified color based on the numeric value of the desired color and the numeric value of the device color; and calculating the modified color filter position based on the numeric value of the modified color.

12. The method of claim 11, wherein each of the numeric value of the device color, the numeric value of the desired color, and the numeric value of the modified color comprises a color matrix.

13. The method of claim 12, wherein each of the numeric value of the device color, the numeric value of the desired color, and the numeric value of the modified color comprises a red, green, blue (RGB) color matrix.

14. The method of claim 12, wherein calculating the color matrix of the numeric value of the modified color comprises multiplying the color matrix of the numeric value of the desired color by an inverse of the color matrix of the numeric value of the device color.

15. The method of claim 10, wherein the optical device is a first optical device, the optical device command is a first optical device command, and the optical device setting value is a first optical device setting value, the method further comprising:

receiving by the control system via the data link a second optical device command, the second optical device command comprising a second optical device setting value for a second optical device configured to modify the light beam emitted by the luminaire;

causing the second optical device to move based on the second optical device setting value;

calculating a numeric value for a second color change associated with the second optical device setting value by calculating a second position change value for the at least one color filter of the plurality of color filters, the second position change value based on the second optical device setting value received via the data link;

for the at least one color filter of the plurality of color filters, calculating a second modified color filter position based on the second position change value and a current color filter position of the color filter; and changing the color of the light beam by causing the at least one color filter of the plurality of color filters to move to the second modified color filter position in the light beam.

16. The method of claim 15, wherein:

calculating the numeric value for the second color change comprises determining a numeric value of a second device color, where the numeric value of the second device color comprises a second color change for each color filter of the plurality of color filters, the second color change associated with the second optical device setting value; and calculating the second modified color filter position for the at least one color filter comprises:

calculating a numeric value of a second desired color based on current filter positions of the plurality of color filters;

calculating a numeric value of a second modified color based on the numeric value of the second desired color and the numeric value of the second device color; and calculating the second modified color filter position based on the numeric value of the second modified color.

* * * * *